United States Patent [19]

Albion et al.

[11] Patent Number: 5,424,535

[45] Date of Patent: Jun. 13, 1995

[54] OPTICAL ANGLE SENSOR USING POLARIZATION TECHNIQUES

[75] Inventors: Nicholas Albion, Brookhaven, Pa.; Romeal F. Asmar, Bellevue, Wash.; Raymond W. Huggins, Mercer Island, Wash.; Glen E. Miller; Charles R. Porter, both of Redondo, Wash.

[73] Assignee: The Boeing Company, Seattle, Wash.

[21] Appl. No.: 55,718

[22] Filed: Apr. 29, 1993

[51] Int. Cl.⁶ .................................. G02F 1/01
[52] U.S. Cl. ............................ 250/225; 250/231.13
[58] Field of Search ............ 250/214 PR, 225, 237 G, 250/231.13, 231.14, 231.16

[56] References Cited

U.S. PATENT DOCUMENTS

| | | |
|---|---|---|
| 2,966,673 | 12/1960 | Guernsey, Jr. . |
| 3,151,247 | 9/1964 | Auvermann . |
| 3,222,978 | 12/1965 | Dreyfus . |
| 3,306,159 | 2/1967 | Beall, Jr. et al. . |
| 3,397,608 | 8/1968 | Ellis . |
| 3,474,255 | 10/1969 | White . |
| 3,532,429 | 10/1970 | Hughes et al. . |
| 3,532,890 | 10/1970 | Denton . |
| 3,584,221 | 12/1970 | Furukawa . |
| 3,612,882 | 10/1971 | Sheppard ............................ 250/208 |
| 3,693,082 | 9/1972 | Jaecklin . |
| 3,773,421 | 11/1973 | Gievers .............................. 250/225 |
| 3,822,098 | 7/1974 | Rudder et al. . |
| 3,938,890 | 2/1976 | Flavell . |
| 3,973,850 | 8/1976 | Pouey . |
| 4,030,828 | 6/1977 | Sonobe et al. . |
| 4,111,524 | 9/1978 | Tomlinson, III . |
| 4,132,378 | 1/1979 | Stevens ............................... 244/175 |
| 4,171,908 | 10/1979 | Robert et al. . |
| 4,198,117 | 4/1980 | Kobayashi . |
| 4,223,216 | 9/1980 | Quick et al. . |
| 4,306,314 | 12/1981 | Griffiths ............................. 455/603 |
| 4,334,152 | 6/1982 | Dakin et al. . |

(List continued on next page.)

FOREIGN PATENT DOCUMENTS

| | | |
|---|---|---|
| 59-85918 | 5/1984 | Japan . |
| 60-161522 | 8/1985 | Japan . |
| 60-227118 | 11/1985 | Japan . |
| 630527 | 9/1978 | U.S.S.R. . |

OTHER PUBLICATIONS

American Holographic Concave Diffraction Gratings Design Guide, Solutions to Spectroscopic Problems Designers Handbook and Catalog, 11 pp.

Dianov et al., "Spectral channel demultiplexer utilizing a planar multimode waveguide," Sov. J. Quantum Electron, 11(2) Feb. 1981, ©1981 American Institute of Physics, pp. 229–230.

Fritsch et al., "Wavelength-division multiplexed digital optical position transducer," Optics Letters, Jan. 1986, 11(1), ©1986, Optical Society of America, 3 pp.

Lerner et al., "Direct reading spectrometer optimization using two complementary concave holographic

(List continued on next page.)

*Primary Examiner*—David C. Nelms
*Attorney, Agent, or Firm*—Christensen, O'Connor, Johnson & Kindness

[57] ABSTRACT

A three-phase angular position sensor is described in which three beams of light having polarization directions rotated 60° to each other are passed through a polarizer, the rotational position of the polarizer representing an angle to be measured. The intensities of the beams transmitted through the polarizer uniquely encode its angle over a 180° range. This range may be doubled, for example, by including a binary track. A two-phase angular position sensor is also described in which two beams have polarization directions oriented 45° with respect to one another.

20 Claims, 10 Drawing Sheets

U.S. PATENT DOCUMENTS

| | | |
|---|---|---|
| 4,443,853 | 4/1984 | Maciolek et al. ............... 364/434 |
| 4,546,466 | 10/1985 | Lopiccolo . |
| 4,560,272 | 12/1985 | Harris . |
| 4,643,519 | 2/1987 | Bussard et al. . |
| 4,651,045 | 3/1987 | Wagner ........................... 310/328 |
| 4,652,080 | 3/1987 | Carter et al. . |
| 4,660,589 | 4/1987 | Bartholomew ................. 137/83 |
| 4,688,934 | 8/1987 | Clark . |
| 4,716,399 | 12/1987 | Nordlund ........................ 340/364 |
| 4,740,688 | 4/1988 | Edwards . |
| 4,742,678 | 5/1988 | Bartholomew et al. ........ 60/516 |
| 4,800,556 | 1/1989 | Charlier et al. . |
| 4,816,672 | 3/1989 | Hughes . |
| 4,863,274 | 9/1989 | Spillman, Jr. et al. . |
| 4,874,245 | 10/1989 | Spillman, Jr. et al. . |
| 4,931,635 | 6/1990 | Toyama .......................... 250/225 |
| 4,958,072 | 9/1990 | Hofler et al. ................... 250/231.13 |
| 4,964,727 | 10/1990 | Huggins . |
| 5,033,694 | 7/1991 | Sato ................................ 244/78 |
| 5,044,155 | 9/1991 | Zimmerman .................... 60/224 |
| 5,073,711 | 12/1991 | Brininstool et al. ............ 250/225 |
| 5,085,125 | 2/1992 | Emo et al. ...................... 91/459 |

OTHER PUBLICATIONS gratings," SPIE vol. 503 Application, Theory, and Fabrication of Periodic Structures (1984), pp. 53–58.

Lewis, "Fiber optic sensors offer advantages for aircraft," SPIE Optical Engineering Reports, Jun. 1987, 2 pp.

Noda et al., "Geometric theory of the grating," Journal of the Optical Society of America, 64(8), Aug. 1974, ©1974 by the Optical Society of America, pp. 1031–1036.

Noda et al., "Design of holographic concave gratings for Seyo–Namioka monochromators," Journal of the Optical Society of America, 64(8), Aug. 1974 ©1974 by the Optical Society of America, pp. 1043–1048.

Pavlycheva, "Design of flat-field spectrograph employing a holographic grating," Sov. J. Opt. Technol. 46(7), Jul. 1979, ©1980 The Optical Society of America, pp. 394–396.

Rowland, "On Concave Gratings for Optical Purposes," Phil. Magazine, vol. XVI, Series 5, Sep. 1983, pp. 197–210.

Touzet et al., "Design of New Holographic Gratings for a High S/N Ratio Flat Field Spectrograph," XPIE vol. 655 Optical System Design, Analysis, and Production for Advanced Technology Systems (1986), Reprinted from Proceedings, pp. 409–415.

Yen et al., "Planar Rowland spectrometer for fiber-optic wavelength demultiplexing," Optics Letters, 6(12), Dec. 1981, ©1981 Optical Society of America, pp. 639–641.

OPTICAL ANGLE SENSOR USING POLARIZATION TECHNIQUES

FIELD OF THE INVENTION

The present invention relates to optical sensors, and in particular, to an optical sensor for determining the rotation angle of a rotatable member.

BACKGROUND OF THE INVETION

The use of passive optical sensors is desired for future military and commercial aircraft, to reduce the negative effects of electromagnetic interference. Many applications exist for passive, optical rotational position sensors (also referred to herein as rotation sensors or angle sensors), but existing sensors are inadequate in terms of resolution, size, and in-line performance monitoring. Many future applications will require optical rotation sensors with 12-bit angular resolution, i.e., 0.09° out of 360° or better. These sensors must be comparable in size and performance to electronic rotary variable differential transformers (RVDTs), which they are designed to replace. An additional shortcoming of current state-of-the-art optical rotation or position sensors is an inability to detect certain anticipated sensor failure modes.

A number of different techniques have been tried in the past to produce optical rotation sensors. One prior art approach is based upon the use of digital encoders and wavelength division multiplexing (WDM). In this approach, a composite optical signal is transmitted to the sensor, the composite signal comprising light in a number of different wavelength ranges. At the sensor, the composite signal is demultiplexed, and the light in each wavelength range is directed to a different track of an encoder plate. Each track includes (for example) transmissive and nontransmissive regions, such that each track encodes one bit of a digital word.

The digital WDM technique has several deficiencies. First, when light emerging from the core of a fiber-optic cable is focused onto an encoder, there is a minimum practical size for the focal spot. This minimum size places a lower limit on the width of the tracks. Practically speaking, this limits the minimum diameter of the encoder plate to above two inches, for a 12-bit rotary encoder using a 100 micron core fiber. Another drawback of the WDM digital encoder is that no adequate and optically simple self-monitoring scheme has been discovered for such a sensor.

Another prior art approach is to fabricate an analog sensor that uses a single analog encoder track having a variable thickness or a variable density dot pattern. The analog track transmits a varying amount of light, depending on the angular position of the encoder plate. Minimum size for this type of sensor is limited by the dimensions of the scanning aperture, and the granularity of the coding or dot pattern.

Other prior approaches have combined analog and digital techniques, for example, as shown in U.S. Pat. No. 4,964,727. This approach overcomes shortcomings of the pure analog or pure digital approaches. However, it is still limited with regard to the minimum encoder plate diameter by feature sizes on the encoder plate, and by dimensions of the scanning aperture.

Another prior approach measures angles by using two linearly polarized beams of light transmitted through a rotating polarizer, the orientation of the polarizer being the angle to be measured. The planes of polarization of the beams are offset 90° from one another. As a result, the intensities of the portions of the beams that are transmitted through the rotating polarizer vary in the manner shown by curves 12 and 14 in FIG. 1. It is assumed that an angle of 0° corresponds to the rotating polarizer having its transmission axis parallel to the plane of polarization of the first beam (curve 12). Curve 12 therefore has maximum values at 0°, 180°, etc. Since the second beam has its plane of polarization 90° from the first beam, curve 14 has maximum values at 90°, 270°, etc. The angular position of the rotating polarizer may be estimated by taking the arctangent of the square root of the ratio of the two transmitted intensities.

Figure 1:
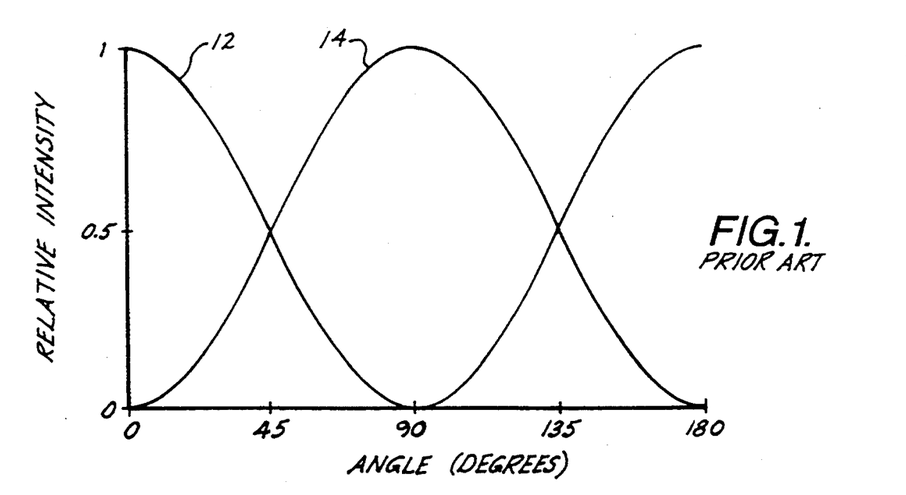
FIG. 1 is a graph illustrating the operation of a prior art, two-phase polarization angle sensor.

An important advantage of this polarization approach is that performance, in terms of resolution and accuracy, is no longer dependent on the size of features on the encoder plate. A major disadvantage of this polarization approach is that it only provides accurate results over a limited range of angles. As can be seen in FIG. 1, the slopes of curves 12 and 14 are both very small when the angle is near a multiple of 90°. As a result, near such angles, small amounts of noise in the detected signals translate into large errors in the angle estimate. FIG. 1 also makes it clear that the signals represented by curves 12 and 14 are only capable of providing unambiguous angle measurement over one quadrant, e.g., from 0° to 90°. Two additional binary tracks would be required to resolve quadrant ambiguity and permit measurement over 360°.

SUMMARY OF THE INVENTION

The present invention provides an angle sensor that is based on polarization techniques, and which also provides accurate results over a substantial angular range.

In a first preferred embodiment, the angle sensing system of the present invention comprises means for creating first, second, and third optical channel signals along first, second, and third optical paths, respectively. Modulation means are positioned in the optical paths for converting the channel signals into respective modulated signals. The modulation means comprise means forming first and second linear polarizers in each optical path. The first linear polarizers have transmission axes that are fixed with respect to a first reference direction, and the second linear polarizers have transmission axes that are fixed with respect to a second reference direction. Each optical path is therefore characterized by an angular difference between the transmission axes of the first and second linear polarizers in that optical path. The angular difference is a function of the orientation of the first reference direction with respect to the second reference direction. The modulation means are formed such that the angular differences for the first, second, and third optical paths are different from one another, preferably by about 60°. Means are provided for measuring the intensities of the modulated signals, and for producing therefrom an estimate of the angular position of the second reference direction with respect to the first reference direction.

In a second preferred embodiment, two channel signals traveling along two optical paths are employed. As for the first embodiment, each optical path includes first and second linear polarizers, and is characterized by an angular difference between the transmission axes of the first and second linear polarizers. In this case, the angular differences preferably differ from one another by about 45°.

Wavelength division multiplexing techniques may be used to create the channel signals from a composite input signal that is transmitted to the modulation means via a fiber-optic cable. In some embodiments, the first linear polarizers comprise a single, unitary polarizer whose rotation angle is to be measured. The unitary polarizer may form part of a rotating disk that includes a binary track for doubling the unambiguous range of the sensor.

DETAILED DESCRIPTION OF THE INVENTION

The present invention provides a technique for detecting angular position by passing each of two or more optical signals or beams through two linear polarizers. The orientation of one set of polarizers with respect to the other set is the angle to be measured. The invention may be applied to produce a rotary encoder, or any other sensor in which one desires to sense angular position.

Figure 2:
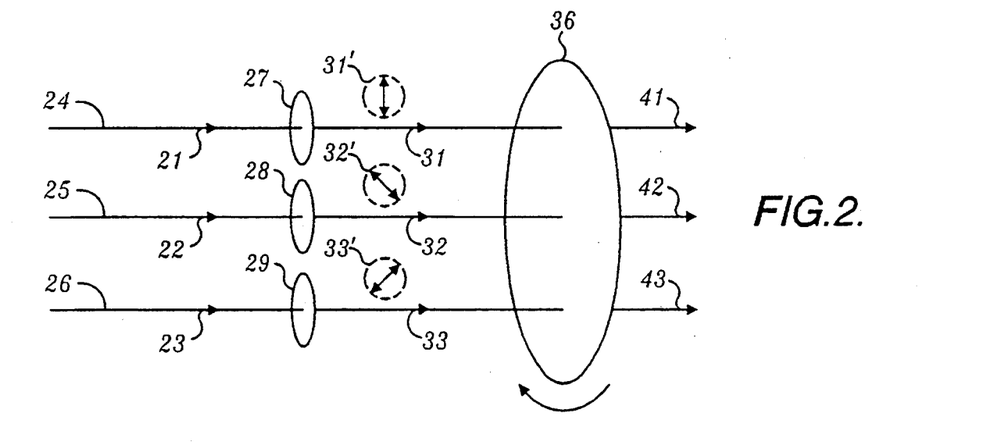
FIG. 2 is a schematic view of a first preferred embodiment of the angle sensor in accord with the present invention.
Figure 3:
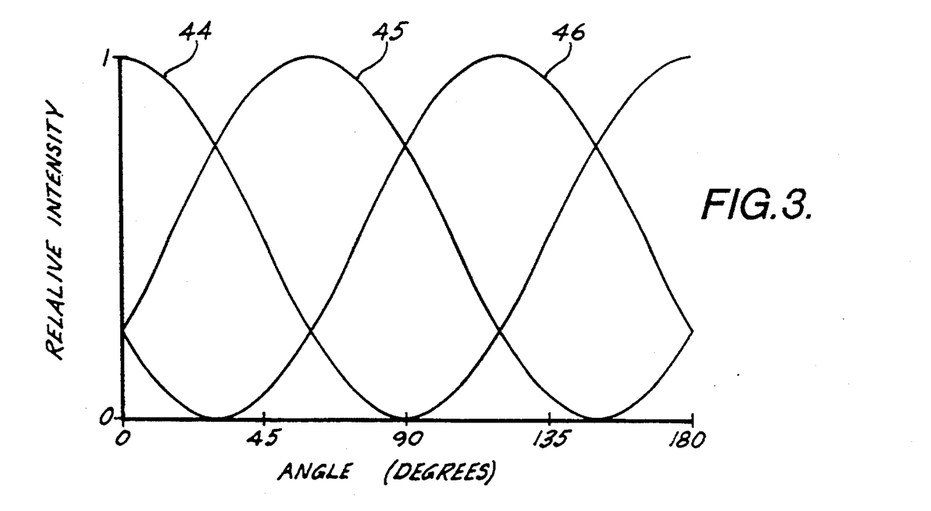
FIG. 3 is a graph showing the operation of the embodiment of FIG. 2.

A first preferred embodiment of the invention is schematically illustrated in FIGS. 2 and 3. Referring initially to FIG. 2, three randomly polarized optical channel signals or beams 21-23 are formed traveling along three parallel optical paths 24-26. Channel signals 21-23 are incident upon three stationary linear polarizers 27-29, producing three linearly polarized beams 31-33. The transmission axes of polarizers 27-29 are rotated 60° with respect to one another, such that the polarization directions of beams 31-33 are also rotated 60° with respect to one another, as schematically illustrated at 31'-33'. Polarized beams 31-33 are incident upon rotatable linear polarizer 36, to produce three modulated transmitted beams 41-43, respectively.

The intensities of modulated beams 41-43 are illustrated by curves 44-46, respectively, in FIG. 3. The angle plotted in FIGURE 3 is the angle between the transmission axis of polarizer 36 and the transmission axis of polarizer 36, i.e., the angle between the transmission axis of polarizer 36 and the polarization direction of beam 31. At any rotation angle in the range 0°-180°, the intensities of the three modulated beams uniquely encode the rotation angle of polarizer 36. Furthermore, at the angles at which one of the intensity curves has a zero slope (e.g., 0°, 60°, 120°), the other two intensity curves have relatively high slopes, thereby permitting accurate angle determination throughout the entire 0°-180° range. Preferably, polarizers 27-29 and 36 are formed from a material (e.g., POLARCOR ® polarizing material available from Corning Glass Company) that has a high extinction ratio, i.e., a high ratio between the maximum transmitted intensity when the polarization axes are parallel and the minimum transmitted intensity when the polarization axes are perpendicular.

It will be appreciated that there are numerous possible variations of the design shown in FIG. 2 that will produce curves similar to 44-46, and which can be used to determine rotation angle in accordance with the present invention. For example, polarizer 36 could be stationary, while polarizers 27-29 are rotated together about their respective optical paths. In addition, it will be apparent that curves 44-46 could be moved horizontally a significant degree with respect to one another, without losing the ability to uniquely and accurately encode an angle. The invention is therefore not limited to three equally spaced polarization directions (0°, 60°, and 120°), although the equal spacing will in general be easier to implement.

It will also be apparent that polarizer 36 could comprise three separate polarizers analogous to polarizers 27-29, rather than a unitary disk. In such an embodiment, each of optical paths 24-26 includes first and second polarizers. The set of three first polarizers rotate together as a unit, with the second polarizers being fixed, or both sets of polarizers can rotate. For all embodiments, each optical path is characterized by an angular difference between the transmission axes of the first and second polarizers in that path. The angular differences of the different paths are different from one another, preferably by 60°, to produce curves 44-46, as shown in FIG. 3.

Figure 4:
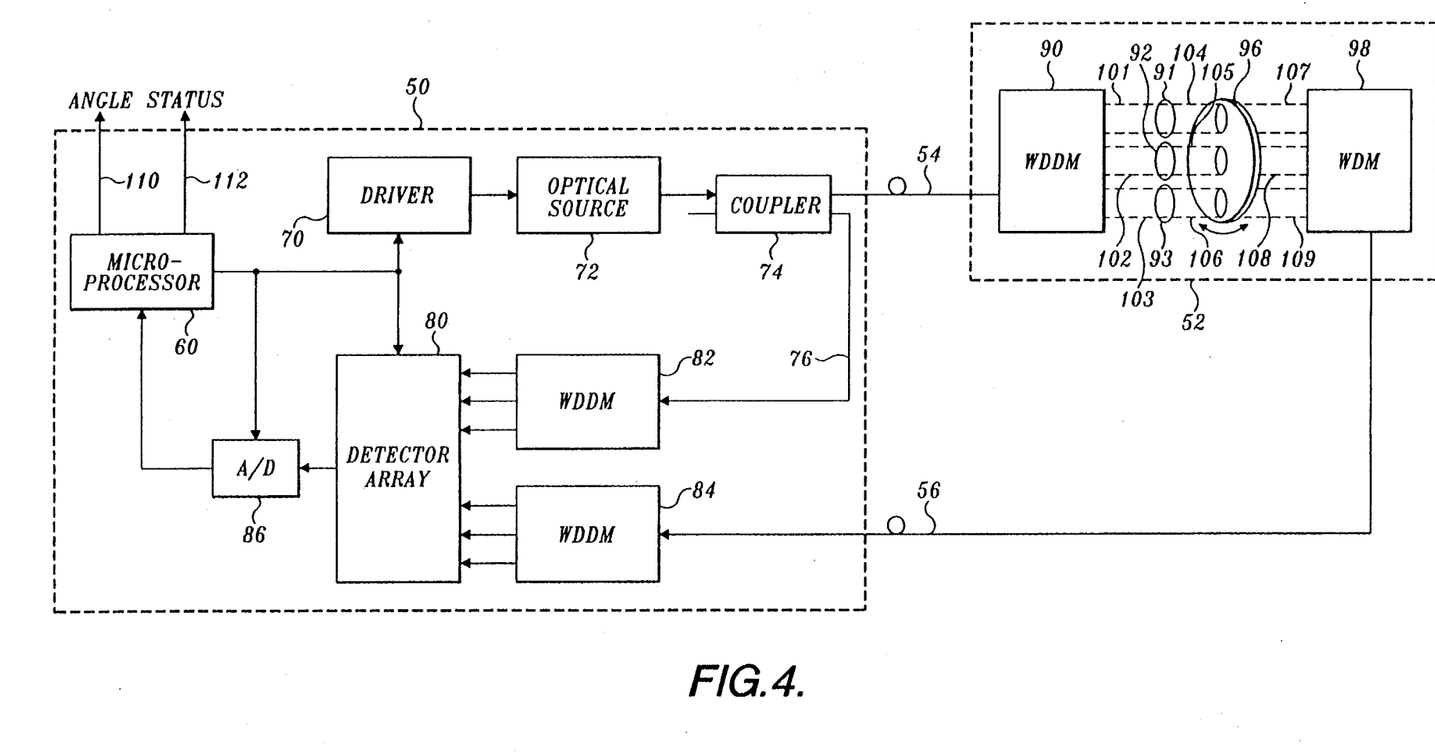
FIG. 4 is a block diagram of a preferred embodiment of the angle sensor.

FIG. 4 illustrates a preferred embodiment of an angle sensing system using the principles shown in FIGS. 2 and 3. This system uses wavelength division multiplexing (WDM) to transfer three optical signals to and from a remote sensor along common fiber-optic cables. The sensing system comprises an electronics module 50 and a sensor 52 interconnected by fiber-optic cables 54 and 56. Electronics module 50 includes a microprocessor 60; an optical source comprising a driver 70, an optical source 72, a coupler 74, and an optical receiver comprising a detector array 80, wavelength division demultiplexers (WDDMS) 82 and 84, and an analog-to-digital (A/D) converter 86. Sensor 52 comprises a wavelength division demultiplexer (WDDM) 90, linear polarizers 91-93, a linear polarizer 96, and a wavelength division multiplexer (WDM) 98. Wavelength demultiplexing can be accomplished in several ways. For example, the light can be split three ways and passed through three bandpass interference filters (not shown), or the light can be dispersed using a diffraction grating (also not shown).

In operation, driver 70 causes optical source 72 to emit a composite input signal that is transmitted by coupler 74 into fiber-optic cable 54. The composite input signal should be sufficiently broadband (e.g., 70-80 nm) to permit demultiplexing into three channels at sensor 52. Although the details are not shown, those of ordinary skill in the art will appreciate that such a source can be implemented using a broadband light emitting diode (LED) (available from Plessey), multiple discrete LEDs having different emission bands, prepackaged multiple LED assemblies (available from Alcatel), or by filtering an incandescent source. When the outputs from different LEDs are combined, the spectral peaks of the LEDs should be spaced far enough from one another to permit demultiplexing without significant cross-talk. In general, a spacing of 30 nm will be ample for most applications.

A small portion of the composite input signal is routed by coupler 74 onto fiber-optic cable 76, and input from there into WDDM 82 for demultiplexing. This signal path is used to compensate for unequal amounts of transmitted optical power in the different wavelength channels. At the sensor, the composite input signal on fiberoptic cable 54 is demultiplexed by WDDM 90, a step that produces three unpolarized channel signals 101-103. Each of channel signals 101-103 comprises light in a wavelength range different from the wavelength ranges of the other two channel signals.

Channel signals 101-103 are incident onto linear polarizers 91-93, respectively. The transmission axes of linear polarizers 91-93 are rotated 60° from one another, as described above in connection with FIG. 2. As a result, three linearly polarized signals 104-106 are produced, the polarization directions of signals 104-106 also being rotated from one another by 60°. In addition, each of signals 104-106 comprises light in a distinct wavelength band. Polarized signals 104-106 are incident onto polarizer 96, whose angular position is to be measured. The resulting modulated (transmitted) signals 107-109 are then multiplexed by WDM 98, to produce a composite output signal that is returned to electronic module 50 via fiber-optic cable 56.

At electronic module 50, the composite output signal is demultiplexed by WDDM 84, an operation that essentially regenerates modulated signals 107-109, and the modulated signals are incident onto detector array 80. In response to timing and control signals from microprocessor 60, the detector array measures the intensity of the modulated signals, and also of the demultiplexed feedback signals generated by WDDM 82. The detected analog intensities are digitized by A/D 86, and input to microprocessor 60. The microprocessor uses these intensities, as described below, to produce an angle signal on line 110 indicating the rotation angle of polarizer 96, as well as a status signal on line 112, indicating whether or not a fault has been detected.

Figure 5:
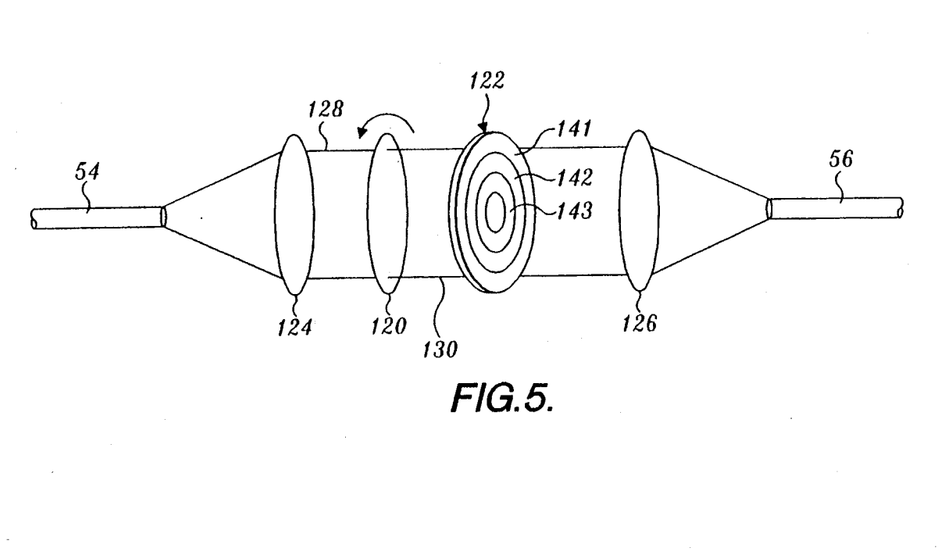
FIG. 5 is a schematic diagram of an alternative angle sensor.

A second embodiment of the sensor is illustrated in FIG. 5. This embodiment includes a rotating polarizer 120, a filter/polarizer disk 122, and lenses 124 and 126. SELFOC® GRIN lenses may be used for lenses 124 and 126. Filter/polarizer disk 122 is divided up into three concentric rings 141-143. Each ring comprises two layers: a linear polarizer and a wavelength filter. The linear polarizers of the three rings have transmission axes rotated 60° from one another, in a manner generally similar to that shown in FIG. 2. In addition, each wavelength filter transmits in a different wavelength range.

The composite optical signal on fiber-optic cable 54 is collimated by lens 124, and the collimated, randomly polarized beam 128 that is produced thereby is incident onto rotating polarizer 120. A polarized beam 130 passing through rotating polarizer 120 is then incident onto filter/polarizer disk 122, and the modulated beams transmitted through the disk are focused by lens 126 into fiber-optic cable 56, to produce the composite output signal. The areas of concentric rings 141-143 are selected such that each ring passes an equal amount of randomly polarized light, taking into account the radial illumination profile of a polarized beam 128 produced by lens 124. Thus, for this embodiment, the three optical paths comprise concentric annular rings that pass through concentric rings 141-143, respectively.

In a variation of the embodiment shown in FIG. 5, filter/polarizer disk 122 rather than rotating polarizer 120 is the rotating element. In this case, the fixed polarizer can be placed before lens 124, or after lens 126, and can therefore be made smaller than it would need to be if placed in the collimated beam.

Figure 6:
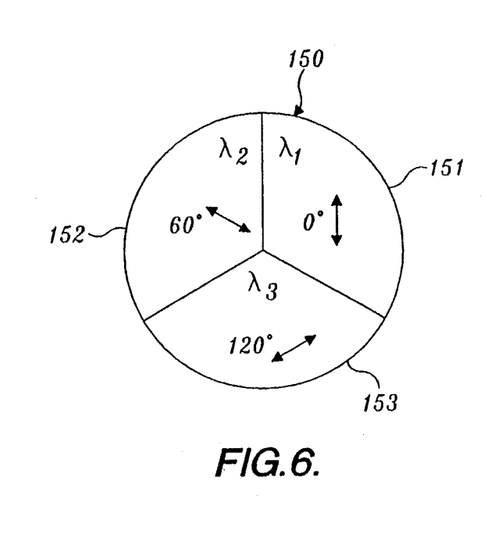
FIG. 6 is a schematic diagram of a polarization plate.

A further embodiment of the invention uses the same general arrangement as shown in FIG. 5, but replaces filter/polarizer disk 122 with a disk 150, as illustrated in FIG. 6. Disk 150 comprises three 120 degree sectors 151-153. Sector 151 transmits in a first wavelength band symbolized by $\lambda_1$, and has a transmission axis oriented at 0°, i.e., vertically in FIG. 6. Sector 152 transmits in a second band $\lambda_2$, and has a transmission axis oriented at 60°. Sector 153 transmits in a third band $\lambda_3$, and has a transmission axis oriented at 120°. Thus in this embodiment, the three optical paths are sector-shaped, and pass through sectors 151-153, respectively. The advantage of using sector-shaped polarizing regions is that radial variance of the beam intensity profile does not change the relative intensities of the three channels.

Returning to FIG. 4, the intensities of modulated signals 107-109 may be written as follows:

$$I_0(\theta) = A(0.5*(k1^2 + k2^2)*\cos^2((\theta) + k1*k2 *\sin^2(\theta))(1) \quad (1)$$

$$I_{60}(\theta) = A(0.5*(k1^2 + K2^2)*\cos^2(\theta - 60 + k1*k2 - *\sin^2(\theta - 60)) \quad (2)$$

$$I_{120}(\theta) = A(0.5*(k1^2 + k2^2)\cos^2(\theta - 120) + k1k2 - *\sin^2(\theta - 120)) \quad (3)$$

In Equations (1)-(3), $\theta$ is the orientation (in degrees) of the transmission axis of polarizer 96 relative to a reference direction, $I_0(\theta)$ is the intensity of modulated signal 107, $I_{60}(\theta)$ is the intensity of modulated signal 108, and $I_{120}(\Theta)$ is the intensity of modulated signal 109. This representation assumes that linear polarizers 91-93 have their transmission axes oriented as shown for linear polarizers 27-29 in FIG. 2, i.e., the transmission axis of linear polarizer 91 is parallel to the reference direction, the transmission axis of linear polarizer 92 is rotated +60° with respect to the reference direction, and the transmission axis of linear polarizer 93 is oriented +120° (or −60°) with respect to the reference direction. The parameter A is a constant corresponding to the intensity that would be detected without the polarizers, and k1 and k2 are the major and minor axis transmittances of a single polarizer. The ratio k1/k2 is commonly referred to as the contrast ratio. The position calculation technique described below is based upon an infinite contrast ratio. This is a reasonable assumption, inasmuch as polarizers are available (e.g., POLARCOR ®) that provide 500:1 or better contrast ratio.

The sum of $I_s$ of the three intensities is:

$$I_s = I_0(\theta) + I_{60}(\theta) + I_{120}(\theta-) = A*(.75*(k1^2+k2^2)+1.5*k1*k2 \approx 0.75*a*A*k1^2 \quad (4)$$

Thus, $I_s$ is a constant, and may be used as an amplitude reference. The estimates of orientation angle can be calculated as follows:

$$\tilde{\theta} = \begin{cases} \cos^{-1}((1.5*\tilde{I}_0/\tilde{I}_s)^{\frac{1}{2}}) & \tilde{I}_{120} \leq \tilde{I}_{60} \\ 180° - \cos^{-1}((1.5*\tilde{I}_0/\tilde{I}_s)^{\frac{1}{2}}) & \tilde{I}_{120} > \tilde{I}_{60} \end{cases} \quad (5)$$

$$\tilde{\theta}_2 = \begin{cases} \cos^{-1}((1.5*\tilde{I}_{60}/\tilde{I}_s)^{\frac{1}{2}}) - 120 & \tilde{I}_{120} \geq \tilde{I}_0 \\ 60° - \cos^{-1}((1.5*\tilde{I}_{60}/\tilde{I}_s)^{\frac{1}{2}}) & \tilde{I}_{120} < \tilde{I}_{60} \end{cases} \quad (6)$$

$$\tilde{\theta}_3 = \begin{cases} \cos^{-1}((1.5*\tilde{I}_{120}/\tilde{I}_s)^{\frac{1}{2}}) - 60 & \tilde{I}_0 \geq \tilde{I}_{60} \\ 120° - \cos^{-1}((1.5*\tilde{I}_{120}/\tilde{I}_s)^{\frac{1}{2}}) & \tilde{I}_0 < \tilde{I}_{60} \end{cases} \quad (7)$$

where: $\tilde{\theta}_1$, $\tilde{\theta}_2$, and $\tilde{\theta}_3$ are three estimates of the angle, and $\tilde{I}_0$, $\tilde{I}_{60}$, and $\tilde{I}_{120}$ are measured intensities on the three channels, and $\tilde{I}_s$ is the sum of the three measured intensities. The three estimates can be combined to yield a composite weighted estimate as follows:

$$\tilde{\theta}_c = (w1*\tilde{\theta}_1 + w2*\tilde{\theta}_2 + w3\tilde{\theta}_3)/(w1+w2+w3) \quad (8)$$

where the weights w1, w2, and w3 are set proportional to the slopes of the three intensity cures at an angle equal to the mean of the three estimates, i.e., $$w1 = \left| \frac{d(I_0(\tilde{\theta}_{AVE}))}{d\theta} \right| \alpha |\sin(2*\tilde{\theta}_{AVE})| \quad (9)$$

$$w2 = \left| \frac{d(I_{60}(\tilde{\theta}_{AVE}))}{d\theta} \right| \alpha |\sin(2*\tilde{\theta}_{AVE} - 60)| \quad (10)$$

$$w3 = \left| \frac{d(I_{120}(\tilde{\theta}_{AVE}))}{d\theta} \right| \alpha |\sin(2*\tilde{\theta}_{AVE} - 120)| \quad (11)$$

$$\tilde{\theta}_{AVE} = (\tilde{\theta}_1 + \tilde{\theta}_2 + \tilde{\theta}_3)/3 \quad (12)$$

Error detection may be accomplished by comparing the differences between the three estimates with weighted thresholds. If a threshold is exceeded, then an error is declared. In addition, the sum of the three detected signals can be monitored, and an error declared if this sum changes significantly between measurements.

Figure 7:
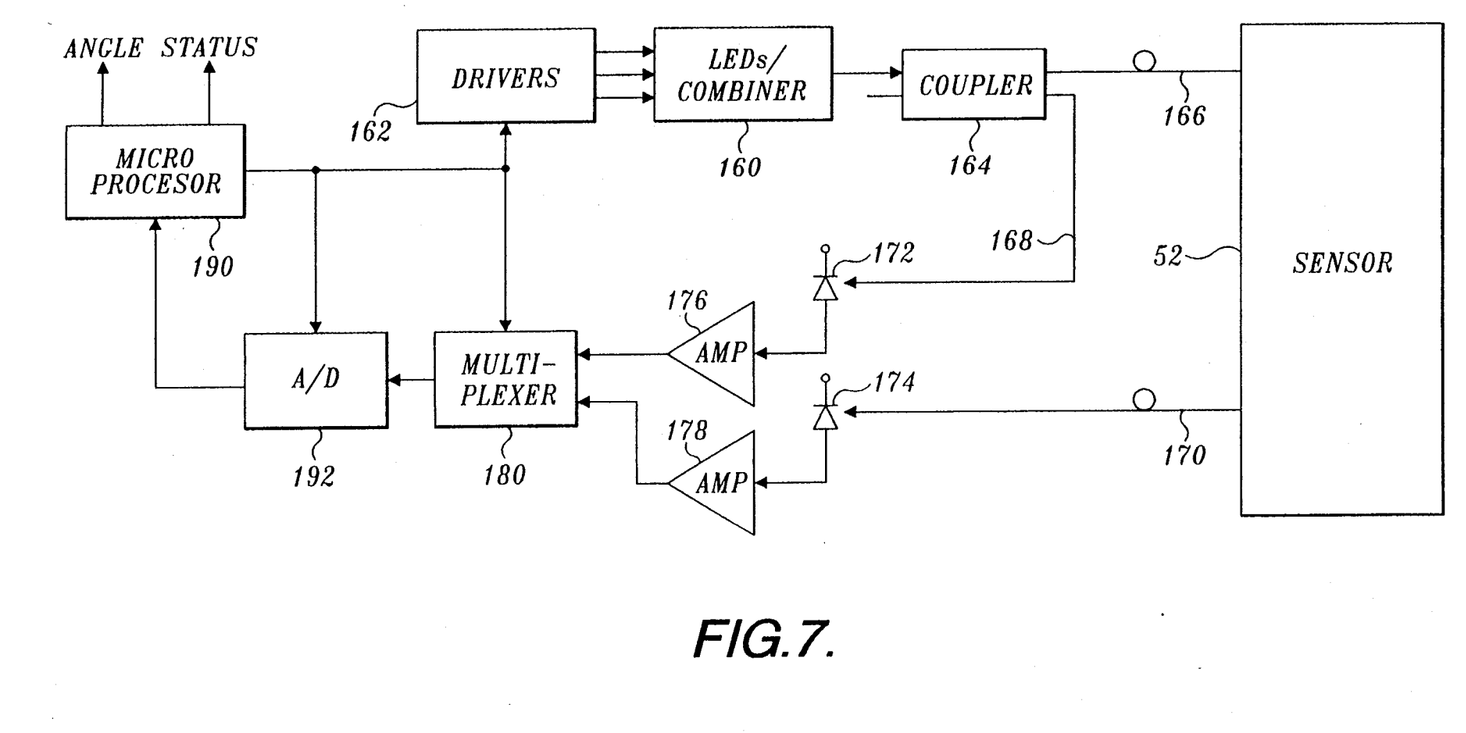
FIG. 7 is a block diagram of a time-division multiplexed embodiment.

Referring back to FIG. 4, if broadband optical source 72 is replaced by three narrower (e.g., 25 nm) wavelength sources whose outputs are combined, then a time division multiplexing (TDM) technique can also be used, as shown in the embodiment of FIG. 7. In this approach, individual LEDs of an LED/combiner 160 are sequentially pulsed by corresponding drivers 162, and the LED output is routed via a coupler 164 to produce an input signal on a fiber-optic cable 166 that is transmitted to sensor 52. A small fraction of the transmitted input signal is coupled into a fiber-optic cable 168. Sensor 52 may be constructed as shown in FIG. 4, and produces a modulated signal on a fiber-optic cable 170. The TDM feedback signal on fiber-optic cable 168 and the TDM modulated signal on fiber-optic cable 170 are received by a pair of PIN photodetectors 172 and 174, respectively, and the corresponding electrical signals are amplified by amplifiers 176 and 178 for input to a multiplexer 180.

In response to timing and control signals from microprocessor 190, multiplexer 180 alternately samples the modulated signal and the feedback signal, and A/D converter 192 converts the samples into digital form for use by the microprocessor. The signal processing may be carried out in a manner identical to that described above in connection with Equations (1)–(12). The principal advantage of the embodiment of FIG. 7 is the elimination of the need for WDDMs 82 and 84 shown in the FIG. 4 embodiment.

The three phase (i.e., three beam) polarization techniques described above are, in general, only capable of providing unambiguous angle measurement over a 180° range. One way to provide a full 360° unambiguous coverage is to add a single, binary coded track. This concept is shown in a sensor 200 of FIG. 8. This sensor includes a disk 202 that comprises a linear polarizer 204 surrounded by a binary coded track 206 that has one state (e.g., on or transmitting) in one 180° sector 206a, and a different state (e.g., off or nontransmitting) in another 180° sector 206b. In this case, a WDDM 208 produces an additional input signal 210 that is incident directly onto binary coded track 206. A resulting binary modulated signal 212 may then be used to resolve the 180° ambiguity.

Figure 8:
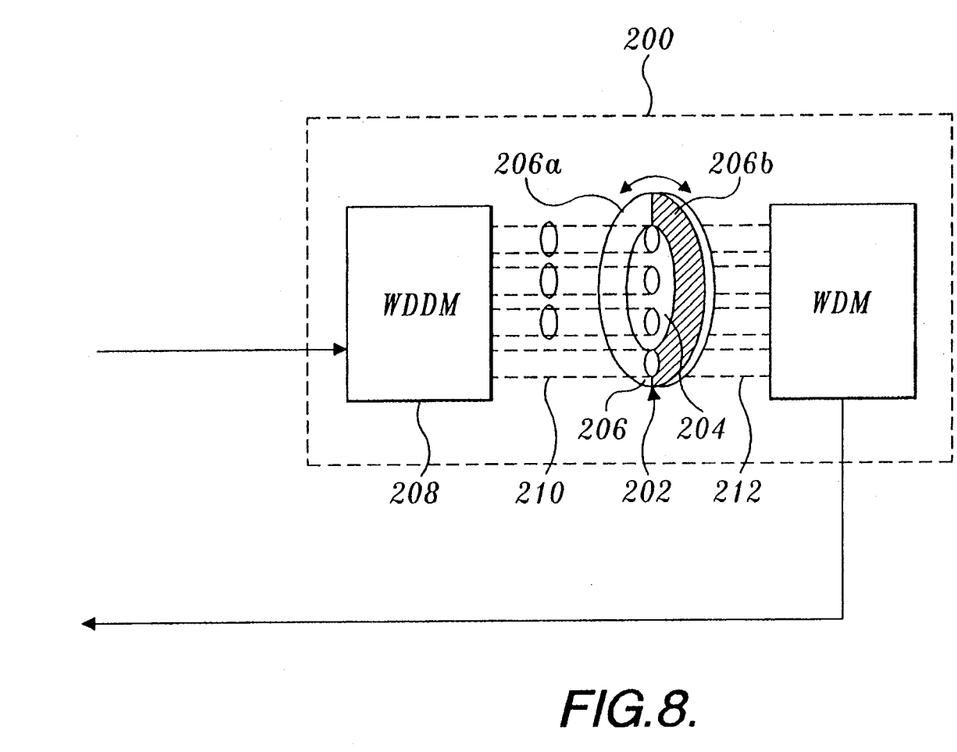
FIG. 8 is a schematic diagram of an embodiment of the angle sensor, including a binary coded track to extend the angular range.

In the embodiment of FIG. 8, a reasonableness check can be used to verify the validity of the data produced by the binary coded track. An error in the binary coded track or associated data channel would cause a measurement error of 180°. Assuming for example a maximum angular velocity of disk 202 of 2000° per second, and an 80 Hz update rate, then the maximum movement between updates would be 25°. A 180° error would cause a change of at least 155° between successive measurements, and would therefore be easily detectable. Additional self-checking of the binary coded track can be accomplished by configuring the binary coded track so that it is not fully occluded in the off-state. For example, the off-state could be half occluded, and the on-state fully transmitting. The amplitude from the binary coded track can then be compared to the reference derived from the three polarized channels. If the signal from the binary channel is significantly below half the maximum, then an error is assumed. If the detected signal in the binary coded track is not near either half maximum or full maximum, and the angle estimate from the polarized channels indicates that the beam of light for the binary track is not near a transition, then an error is declared.

Figure 9:
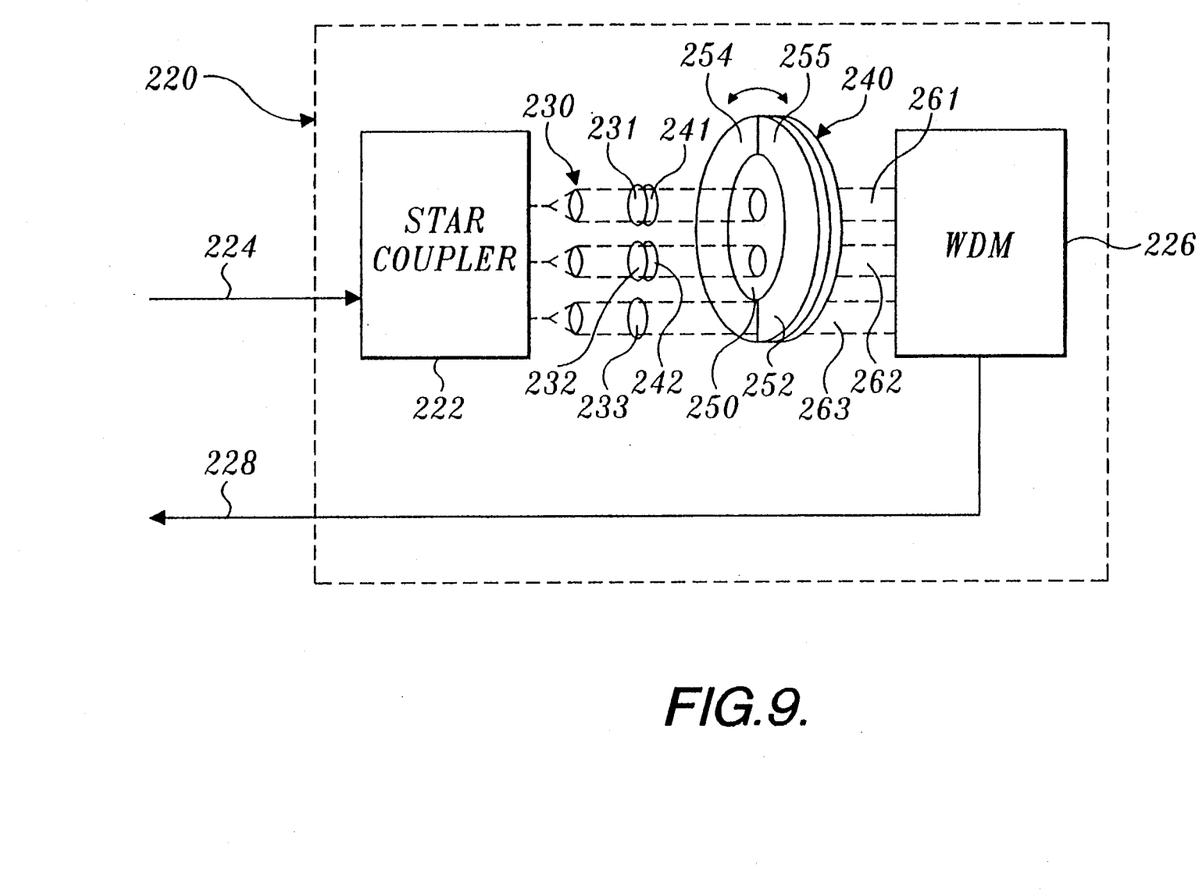
FIG. 9 is a schematic diagram of a sensor showing an alternate technique for extending the angular range.

An alternative way of removing the 180° ambiguity is illustrated by the embodiment of FIG. 9. In this embodiment, a sensor 220 comprises a star coupler 222 that is coupled to an input fiber-optic cable 224, and a WDM 226 that is coupled to an output fiber-optic cable 228. Star coupler 222 divides the composite input signal on fiber-optic cable 224 into three substantially identical channel signals that are collimated by lenses 230, and the collimated beams are incident onto linear polarizers 231–233. A first and a second wavelength filter 241, 242 are attached to linear polarizers 231, 232, respectively. Light passing through the linear polarizers and filters is incident onto a rotating disk 240 that includes a linear polarizer. In particular, the beams emerging from filters 241 and 242 are incident onto a central portion 250 of rotating disk 240, and unfiltered light produced by linear polarizer 233 is incident onto an outer ring 252 of rotating disk 240, outer ring 252 including two separate wavelength filters 254 and 255. The result is three modulated beams 261-263 that are input to WDM 226 for multiplexing onto output fiber-optic cable 228. The use of two different wavelengths for the outermost track of rotating disk 240 permits resolution of the 180° ambiguity.

Figure 10:
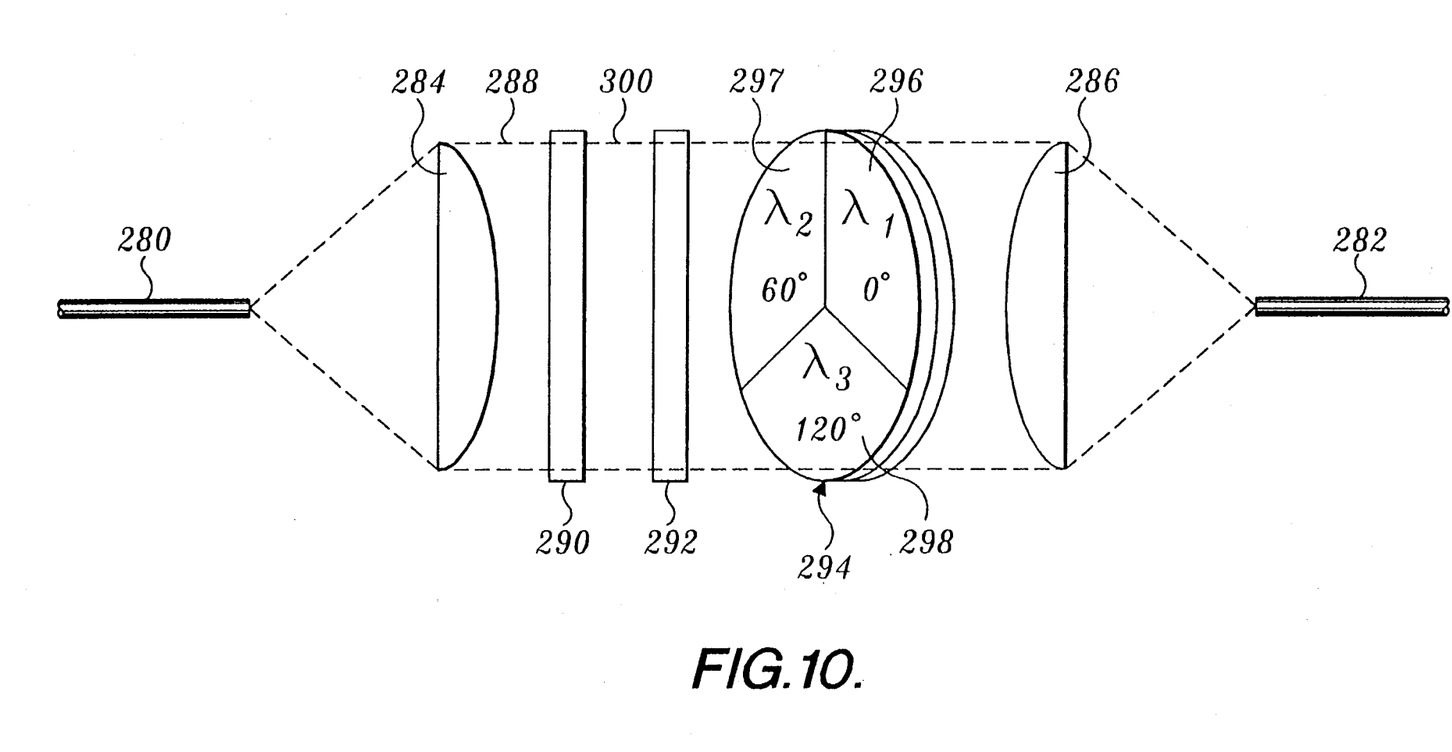
FIG. 10 is a schematic diagram of an embodiment of the angle sensor using a half wave plate to increase resolution.

FIG. 10 illustrates an embodiment in which a two-fold improvement in resolution is achieved, at the expense of halving the unambiguous range. This embodiment includes input and output fiber-optic cables 280 and 282, a collimating lens 284 and a focusing lens 286. Collimating lens 284 produces a collimated beam 288 that passes through a rotating linear polarizer 290, a fixed half wave plate 292, and a fixed disk 294. Fixed disk 294 comprises three 120° sectors 296-298 that are constructed as shown in FIG. 6, i.e., each sector includes a different wavelength filter, and has its polarization axis oriented at 60° with respect to the other two sectors. In operation, the randomly polarized light of collimated beam 288 passes through rotating linear polarizer 290, which polarizes the light in a direction corresponding to its angular orientation. A linearly polarized beam 300 is then passed through half wave plate 292, which doubles the polarization angle of the beam. The doubled beam is then passed through fixed disk 294, as in the embodiments disclosed above.

Figure 11:
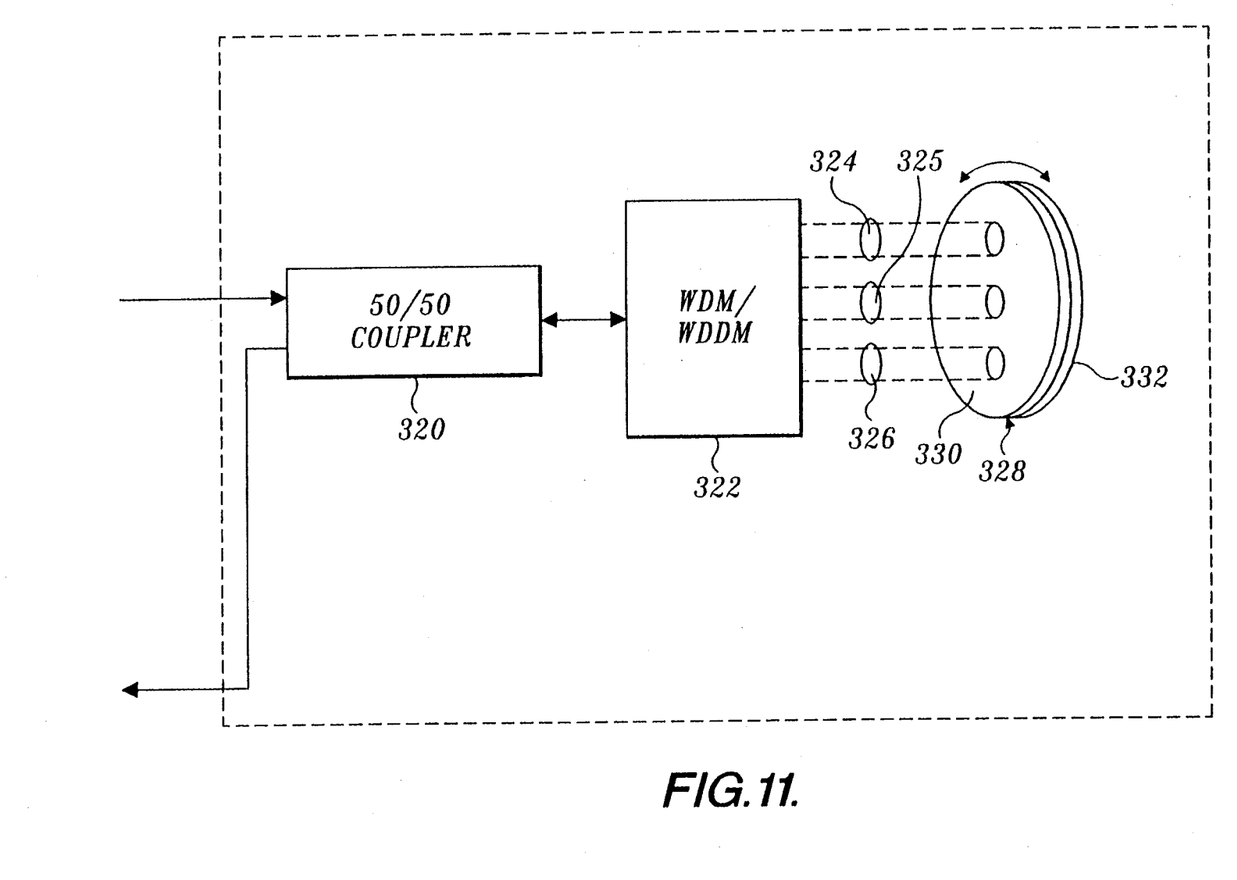
FIG. 11 is a schematic diagram of a reflective embodiment of the angle sensor.

All sensors discussed herein are capable of operating in a reflective mode, wherein light is reflected back through the sensor rather than transmitted through it. An exemplary reflective embodiment is illustrated in FIG. 11. This embodiment includes a 50/50 coupler 320, a WDM/WDDM 322, linear polarizers 324-326, and a rotating disk 328 that includes a linear polarizer 330 on a side facing linear polarizers 324-326, and a reflector 332 on its back surface. Numerous other arrangements are of course possible, including one in which reflector 332 is a separate element, not attached to linear polarizer 330.

In a reflective embodiment, the sum of the three detected intensities is constant, independent of angle, just as for any of the transmission embodiments already disclosed. Advantages of the reflective design include more compact routing of the optical fiber at the sensor, and the possibility of two-way transmission over a single optical fiber if reflections from in-line connectors are adequately suppressed. The main disadvantages of reflective embodiments are additional signal losses resulting from an extra pass through the polarizers, and from two passes through the 50/50 coupler. In addition, sensor resolution and accuracy are not uniform with a varying angle, in reflective embodiments.

Figure 12:
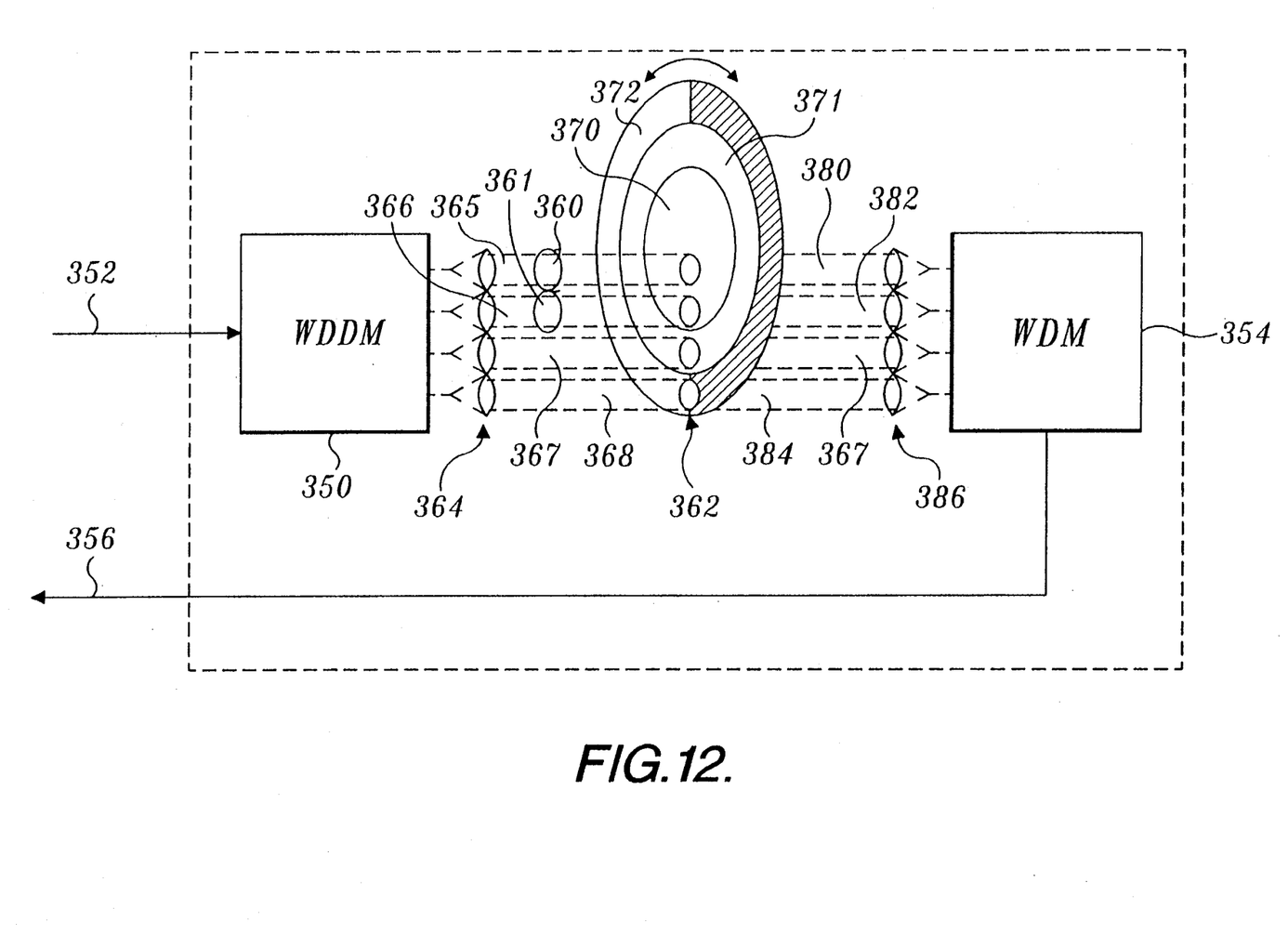
FIG. 12 is a schematic diagram of a preferred two-phase angle sensor in accord with the present invention.
Figure 13:
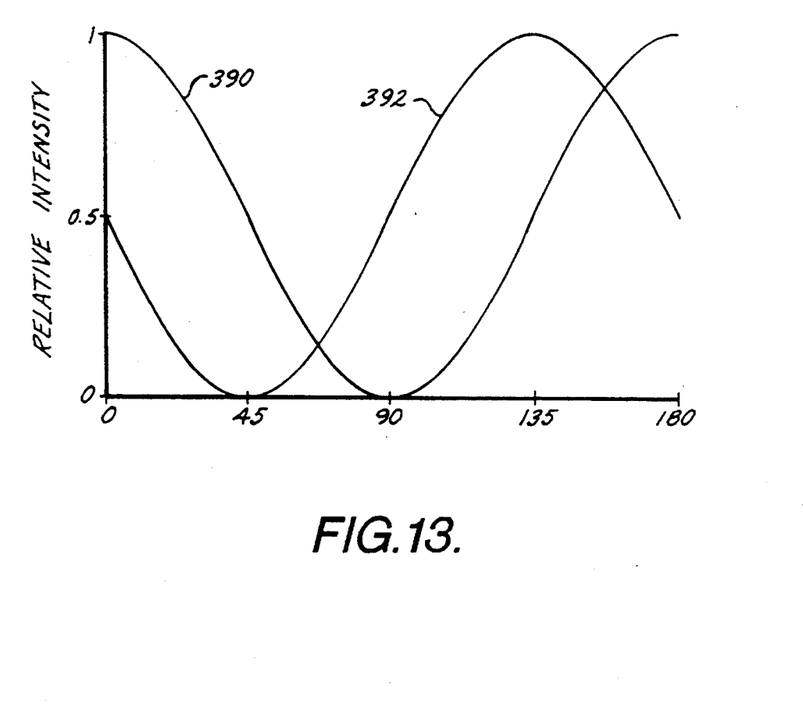
FIG. 13 is a graph illustrating the operation of the embodiment of FIG. 12.

The sensors illustrated to this point have relied on the use of three channels, i.e., three polarization states, to encode an angle. These embodiments may be referred to as three-phase designs. A two-phase embodiment of the present invention is illustrated in FIG. 12, and the operation of this embodiment is shown by the graph of FIG. 13. Referring initially to FIG. 12, the two-phase embodiment comprises a WDDM 350 coupled to an input fiber-optic cable 352, a WDM 354 coupled to an output fiber-optic cable 356, linear polarizers 360 and 361, and a rotating disk 362 that comprises a linear polarizer 370, a clear track 371, and a binary track 372. The transmission axes of linear polarizers 360 and 361 are offset 45° with respect to one another.

WDDM 350 demultiplexes the composite input signal on input fiber-optic cable 352, to produce four optical signals that are collimated by a lenses 364 to produce channel signals 365-368. Each channel signal comprises light in a wavelength range different from the wavelength ranges of the other channel signals. Channel signals 365 and 366 are incident onto linear polarizers 360 and 361, respectively, and from there, these signals pass through linear polarizer 370 of disk 362. As a result, modulated signals 380 and 382 that are transmitted through disk 362 have the intensity profiles shown by curves 390 and 392 in FIG. 13, with an offset 450 relative to one another. Channel signal 367 passes through clear track 371, while channel signal 368 passes through binary track 372, to produce modulated signal 384. The modulated signals and channel signal 367 are focused by lenses 386, and multiplexed by WDM 354, to produce the composite output signal on output fiber-optic cable 356. Binary track 372 extends the unambiguous range of the sensor from 180° to 360°. The use of clear track 371 is desirable to enhance self-monitoring, since it is otherwise difficult to detect signal loss. An advantage of using two rather than three phases is that there is one less polarizer that must be accurately aligned.

Figure 14:
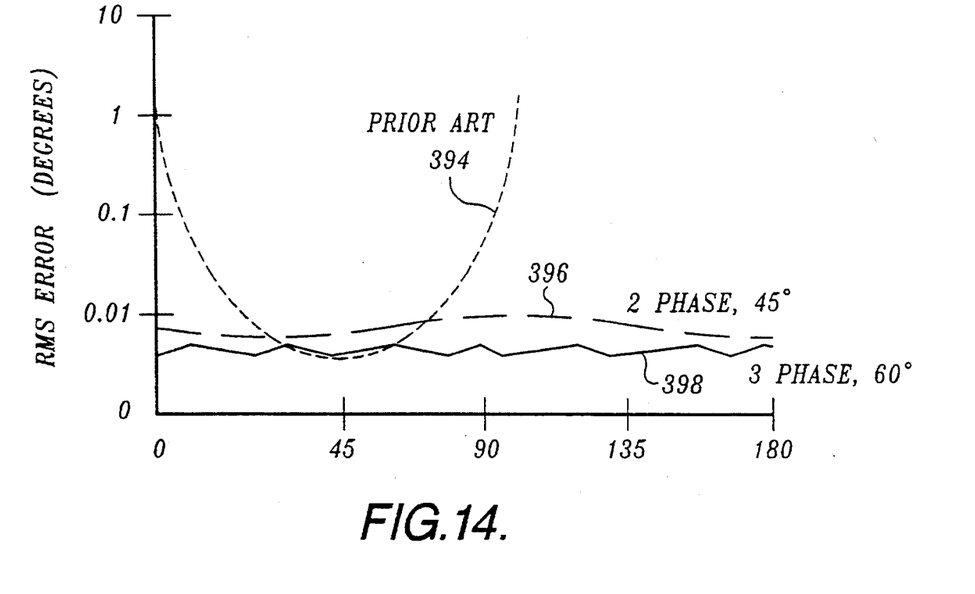
FIG. 14 is a graph illustrating error as a function of angle for the two and three phase embodiments of the angle sensor in accord with the present invention, and for a prior art polarization device.

FIG. 14 is a graph plotting a root mean squared (RMS) error versus angle for the three-phase approach, the two-phase approach of FIGS. 12-13, and the prior art approach that uses two phases offset 90° with respect to one another. In particular, a curve 394 represents the prior art approach using two phases offset 90°; a curve 396 represents the approach of FIG. 12, with two phases offset 45°; while a curve 398 represents the three-phase approach. The improvement provided by the present invention is readily apparent. For the data presented in these graphs, it was assumed that the peak electric signal to noise ratio in each channel was 60 dB.

While the preferred embodiments of the invention have been illustrated and described, variations will be apparent to those skilled in the art. For example, although the optical paths in the illustrated embodiment have been physically separate from one another, time division multiplexing techniques could be used to produce embodiments in which the optical paths were overlapping or partially overlapping with one another. Accordingly, the scope of the invention is to be determined by reference to the following claims.

The embodiments of the invention in which an exclusive property or privilege is claimed are defined as follows:

1. An angle sensing system, comprising:
   (a) means for creating first, second, and third optical channel signals along first, second, and third optical paths, respectively, each channel signal comprising light in a wavelength range different from the wavelength ranges of the other channels;
   (b) modulation means for converting the first, second, and third optical channel signals into first, second, and third modulated signals, respectively, the modulation means comprising means forming first linear polarizers and second linear polarizers in each optical path, the first linear polarizers having transmission axes that are fixed with respect to a first reference direction, the second linear polarizers having transmission axes that are fixed with respect to a second reference direction, such that each optical path is characterized by an angular difference between the transmission axes of the first and second linear polarizers in the optical path, which angular difference is a function of an orientation of the first reference direction with respect to the second reference direction, the angular differences for the first, second, and third optical paths being different from one another; and (c) means for measuring intensities of the modulated signals, and for producing therefrom an estimate of an angular position of the second reference direction with respect to the first reference direction.

2. The system of claim 1, wherein said three angular differences differ from one another by about 60°.

3. The system of claim 1, further comprising:
(a) means for generating a composite input signal;
(b) means for wavelength demultiplexing the composite input signal to produce the first, second, and third optical channel signals; and
(c) means for multiplexing the modulated signals to produce a composite output signal.

4. The system of claim 3, further comprising a first fiber-optic cable for conveying the composite input signal to the means for wavelength demultiplexing the composite input signal, and a second fiber-optic cable for conveying the composite output signal to the means for measuring the intensities of the modulated signals.

5. The system of claim 1, wherein the means for forming the first linear polarizers in each optical path comprise a unitary polarizer positioned in the first, second and third optical paths.

6. The system of claim 5, wherein the second linear polarizers are fixed, and wherein the unitary polarizer is rotatable about an axis parallel to the optical paths.

7. The system of claim 6, further comprising a rotatable disk that comprises the unitary polarizer and a binary track, and means for generating a fourth optical channel signal along a fourth optical path that passes through the binary track, to thereby produce a fourth modulated signal.

8. The system of claim 1, further comprising means for time division multiplexing the first, second, and third optical channel signals.

9. The system of claim 1, further comprising reflection means for reflecting the first, second, and third modulated signals, such that they travel in a reverse direction along the first, second, and third optical paths, respectively.

10. The system of claim 1, wherein the first optical channel signal comprises light in different first and second wavelength ranges; and wherein the first linear polarizer in the first optical path comprises a first portion that transmits light in the first wavelength range but not in the second wavelength range, and a second portion that transmits light in the second wavelength range but not in the first wavelength range.

11. The system of claim 3, wherein the first linear polarizers comprise three, concentric annular portions of a unitary disk.

12. The system of claim 11, wherein the means for wavelength demultiplexing comprise three optical filters positioned on the unitary disk.

13. The system of claim 3, wherein the first linear polarizers comprise three sector-shaped portions of a unitary disk.

14. The system of claim 13, wherein the means for wavelength demultiplexing comprise three optical filters positioned on the unitary disk.

15. The system of claim 1, further comprising a half-wave plate positioned in each optical path between the first linear polarizer and the second linear polarizer.

16. An angle-sensing system comprising:
(a) means for creating first and second optical channel signals along corresponding first and second optical paths, respectively, each channel signal comprising light in a wavelength range different from the wavelength ranges of the other channels;
(b) modulation means for converting the first and second optical channel signals into first and second modulated signals, respectively, the modulation means comprising means forming first and second linear polarizers in each optical path, the first linear polarizers having transmission axes that are fixed with respect to a first reference direction, and the second linear polarizers having transmission axes that are fixed with respect to a second reference direction, such that each optical path is characterized by an angular difference between the transmission axes of the first and second linear polarizers in the optical path, which angular difference is a function of an orientation of the first reference direction with respect to the second reference direction, angular differences for the first and second optical paths differing from one another by about 45°; and
(c) means for measuring intensities of the modulated signals, to thereby produce an estimate of an angular position of the second reference direction with respect to the first reference direction.

17. The system of claim 16, wherein the means for forming the first linear polarizers in each optical path comprise a unitary polarizer positioned in the first and second optical paths.

18. The system of claim 17, wherein the second linear polarizers are fixed, and wherein the unitary polarizer is rotatable about an axis parallel to the optical paths.

19. The system of claim 18, further comprising a rotatable disk that includes the unitary polarizer and a binary track, and means for generating a third optical channel signal along a third optical path that passes through the binary track, to thereby produce a third modulated signal.

20. The system of claim 19, wherein the rotatable disk includes an unmodulated track, and wherein the system further comprises means for generating a fourth optical channel signal along a fourth optical path that passes through the unmodulated track, to thereby produce an unmodulated channel signal for providing an intensity reference.

* * * * *

UNITED STATES PATENT AND TRADEMARK OFFICE
CERTIFICATE OF CORRECTION

PATENT NO. : 5,424,535  
DATED : June 13, 1995  
INVENTOR(S) : N. Albion et al.

Page 1 of 2

It is certified that error appears in the above-indentified patent and that said Letters Patent is hereby corrected as shown below:

| COLUMN | LINE | ERROR |
|---|---|---|
| 6 (Equation (1)) | 42 | "$I_0(\theta) = A(0.5*(k1^2+k2^2)*\cos^2((\theta)+k1*k2*\sin^2(\theta))(1)$" should read --$I_0(\theta) = A(0.5*(k1^2+k2^2)*\cos^2(\theta)+k1*k2*\sin^2(\theta))(1)$-- |
| 6 (Equation (2)) | 44 | "$I_{60}(\theta) = A(0.5*(k1^2 \div K2^2)*\cos^2(\theta-60+k1*k2-*\sin^2(\theta-60))$" should read --$I_{60}(\theta) = A(0.5*(k1^2+k2^2)*\cos^2(\theta-60)+k1*k2*\sin^2(\theta-60))$-- |
| 6 (Equation (3)) | 46 | "$I_{120}(\theta) = A(0.5*(k1^2 \div k2^2)\cos^2(\theta-120) \div k1k2-*\sin^2(\theta-120))$" should read --$I_{120}(\theta) = A(0.5*(k1^2+k2^2)*\cos^2(\theta-120)+k1*k2*\sin^2(\theta-120))$-- |
| 6 | 53 | "$I_{120}(\theta)$" should read --$I_{120}(\theta)$-- |
| 7 (Equation (4)) | 5 | "$I_s = I_0(\theta)+I_{60}(\theta)+I_{120}(\theta-) = A*(.75*(k1^2+k2^2)+1.5*k1*k2 \approx 0.75*a*A*k1^2$" should read --$I_s = I_0(\theta)+I_{60}(\theta)+I_{120}(\theta) = A*(.75*(k1^2+k2^2)+1.5*k1*k2 \approx 0.75*A*k1^2$-- |
| 7 (Equation (8)) | 31 | "$\tilde{\theta}_c = (w1*\tilde{\theta}_1 + w2*\tilde{\theta}_2 + w3\tilde{\theta}_3)/(w1+w2+w3)$" should read --$\tilde{\theta}_c = (w1*\tilde{\theta}_1 + w2*\tilde{\theta}_2 + w3*\tilde{\theta}_3)/(w1+w2+w3)$-- |

UNITED STATES PATENT AND TRADEMARK OFFICE
CERTIFICATE OF CORRECTION

PATENT NO. : 5,424,535
DATED : June 13, 1995
INVENTOR(S) : N. Albion et al.

It is certified that error appears in the above-indentified patent and that said Letters Patent is hereby corrected as shown below:

| COLUMN | LINE | ERROR |
|---|---|---|
| 7 | 34 | "cures" should read --curves-- |
| 12 (Claim 16, | 18 line 6) | "charmels" should read --channels-- |

Signed and Sealed this

Thirty-first Day of October 1995

*Attest:*

BRUCE LEHMAN

*Attesting Officer*   Commissioner of Patents and Trademarks